S. J. MACKIE.
Construction of Vessels.

No. 148,074. Patented March 3, 1874.

Witnesses: Edw Stevens 67 Strand
Arthur Mayhew 67 Strand

Samuel Joseph Mackie

AM. PHOTO-LITHOGRAPHIC Co. N.Y. (OSBORNE'S PROCESS.)

UNITED STATES PATENT OFFICE.

S. J. MACKIE, OF KENSINGTON, GREAT BRITAIN.

IMPROVEMENT IN THE CONSTRUCTION OF VESSELS.

Specification forming part of Letters Patent No. 148,074, dated March 3, 1874; application filed January 8, 1870.

*To all whom it may concern:*

Be it known that I, SAMUEL JOSEPH MACKIE, of 84 Kensington Park Road, in the county of Middlesex and Kingdom of Great Britain, have invented Improvements in the Construction of Ships and Steam-Vessels, of which the following is a specification:

The object and intention of my invention are to enable vessels to be built of great beam, of light draft of water, of great strength and security with the lightest material, of great stability and steadiness, and of great speed.

Figure 1:
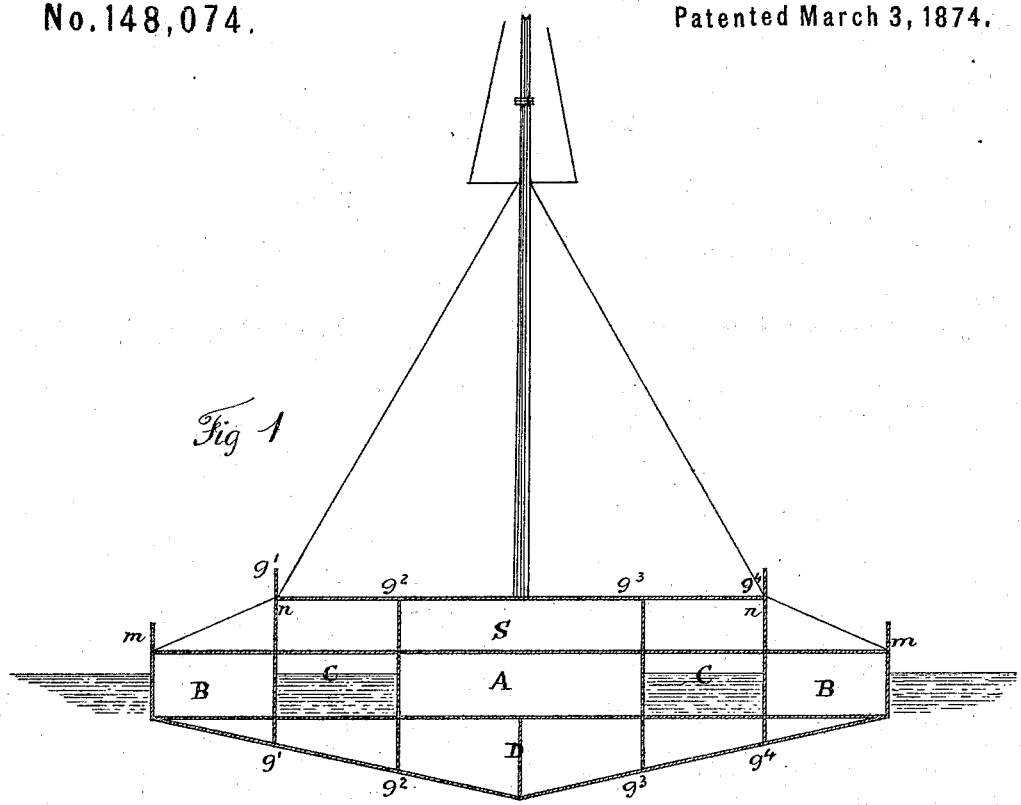
Figure 2:
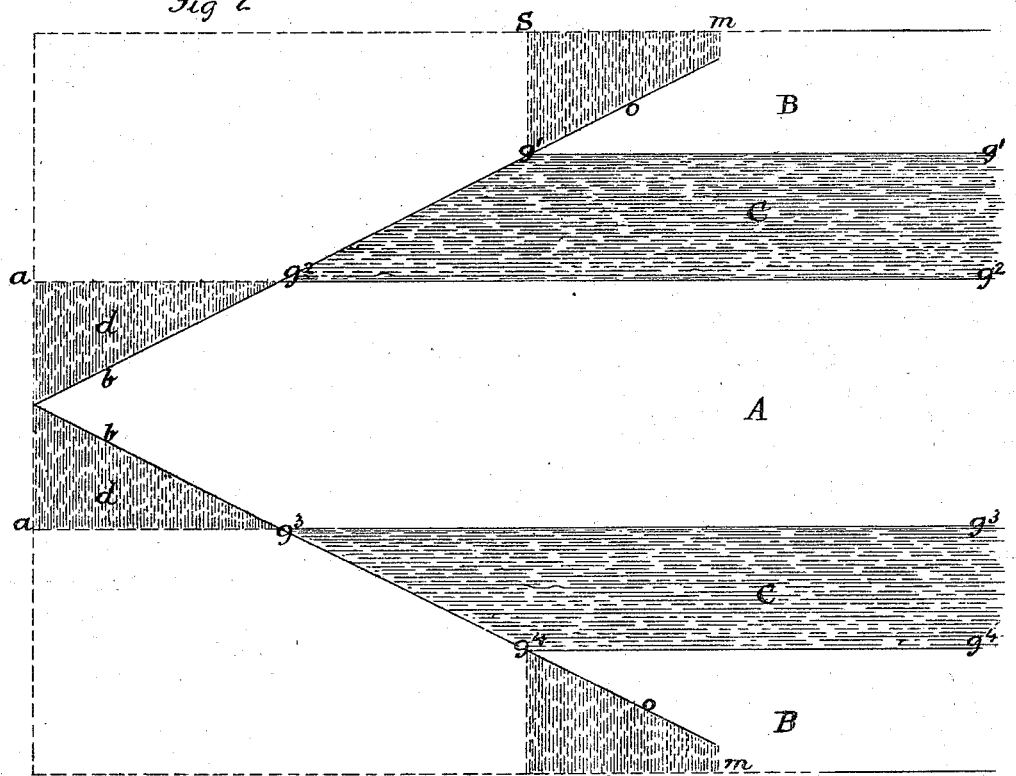

For this purpose I divide the vessel longitudinally into three hulls or compartments, a central hull, A, Figures 1 and 2, and two lateral hulls, B B, Figs. 1 and 2. I separate these lateral hulls from the central hull by two tubular water-ways, C C, Figs. 1 and 2, to permit the passage of water $d$ $d$, Fig. 2, thrown off by the bows $b$ $b$, Fig. 2, of the central hull A, thereby lessening the distance to which the water (through which the ship moves) has to be displaced laterally in respect to the distance the water would have to be displaced if the three compartments had constituted one hull, as in ordinary ships. I connect these three hulls below by a double bottom or submerged hull, D, Fig. 1, and at top by a main-deck, $m$ $m$, Fig. 1, and by a saloon-deck, $n$ $n$, Fig. 1, so that the whole vessel forms a composite box-girder, in which the webs of the constituent longitudinal girders $g^1$ $g^2$ $g^3$ $g^4$ reach from top to bottom of the vertical height of the vessel, including the saloon, which is thus made a strengthening box-girder, as well as a constituent part of the vessel, instead of being a mere addition to the ship, as at present. All these longitudinal girders are made of flat plates, and are perfectly straight and parallel. By this disposition, the water from the four bows is driven off in four smaller distances co-incidently in the same smaller period of time, instead of, as in the existing single-hulled vessels, the much greater distance in the greater interval of time; and, also, by this mode of construction, the greatest possible strength can be obtained from plates of the minimum of thickness. By means of the three longitudinal compartments, in combination with the ordinary transverse divisions or bulk-heads employed in all well-built ships, absolute safety from foundering and danger from collisions is provided.

By the separation of the vessel into three longitudinal compartments, the breadth of beam is increased, according to the distance at which those compartments are set apart by the water-ways, no buoyancy being thus lost, while the water in those channels acts as a weight on the side of the lifting wave to keep the vessel down on that side at the same time that the buoyancy of the outer hull on the opposite side acts with increasing energy as a spring to bring that side of the vessel up in proportion as the outer hull is immersed.

Steam-power or sails can be used as motive power, increased speed being the result of the diminishment of the head resistance, the water being thrown away from the four bows co-incidently in four shorter distances with relief by the water-way, instead of the whole distance at once without any relief at all, as in ordinary ships.

I claim and desire to secure by Letters Patent of the United States—

A vessel constructed in three longitudinal compartments, separated by two intermediate, perfectly straight, and parallel water-ways, braced and connected together below by a submerged double bottom, and above by a main-deck and box-girder saloon, as described.

SAMUEL JOSEPH MACKIE.

Witnesses:
   EDWD. STEVENS,
      67 *Strand, London.*
   J. B. WYNN,
      24 *Royal Exchange, London.*